US009805295B2

(12) United States Patent
Horie

(10) Patent No.: US 9,805,295 B2
(45) Date of Patent: Oct. 31, 2017

(54) IMAGE FORMING APPARATUS AND OPERATING DEVICE

(71) Applicant: KYOCERA DOCUMENT SOLUTIONS INC., Osaka (JP)

(72) Inventor: Akira Horie, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/244,747

(22) Filed: Apr. 3, 2014

(65) Prior Publication Data
US 2014/0300929 A1 Oct. 9, 2014

(30) Foreign Application Priority Data

Apr. 4, 2013 (JP) ................................. 2013-078431

(51) Int. Cl.
| G06F 15/00 | (2006.01) |
| G06K 15/00 | (2006.01) |
| G03G 15/00 | (2006.01) |
| G03G 21/16 | (2006.01) |

(52) U.S. Cl.
CPC ......... G06K 15/40 (2013.01); G03G 15/5016 (2013.01); G03G 21/1604 (2013.01); G03G 21/1614 (2013.01)

(58) Field of Classification Search
CPC .......... G03G 15/5016; G03G 21/1604; G03G 21/1614; G06K 15/40
USPC ...................................... 358/1.15
See application file for complete search history.

(56) References Cited

U.S. PATENT DOCUMENTS

| 8,109,481 B2 | 2/2012 | Suzuki et al. |
| 8,737,867 B2 | 5/2014 | Sato |
| 2005/0226647 A1* | 10/2005 | Lee ................................. 399/81 |
| 2006/0006298 A1 | 1/2006 | Akiyama et al. |
| 2006/0171734 A1 | 8/2006 | Maeda |

(Continued)

FOREIGN PATENT DOCUMENTS

| EP | 1748637 A1 | 1/2007 |
| JP | 11-119498 A | 4/1999 |

(Continued)

OTHER PUBLICATIONS

The extended European search report issued by the European Patent Office dated Aug. 14, 2014, which corresponds to European Patent Application No. 14163379.2-1560 and is related to U.S. Appl. No. 14/244,747.

*Primary Examiner* — Mark Milia
(74) *Attorney, Agent, or Firm* — Studebaker & Brackett PC

(57) ABSTRACT

An image forming apparatus includes an operating section. The operating section projects forward from an upper housing of the image forming apparatus. The operating section includes an input section and a display section. The input section is for receiving input of image forming information. The display section is disposed adjacent to the input section and displays the image forming information thereon. A position of the display section is switchable between a first position and a second position. The first position is where the display section is flush with the input section. The second position is where the display section is tilted forward more than the input section, by turning the display section on a front edge side of the display section as a pivot to raise a rear edge side of the display section upward from the first position.

19 Claims, 13 Drawing Sheets

(56) References Cited

U.S. PATENT DOCUMENTS

| | | | |
|---|---|---|---|
| 2007/0024924 | A1 | 2/2007 | Ikeno et al. |
| 2007/0228232 | A1 | 10/2007 | Ikeno et al. |
| 2009/0103251 | A1 | 4/2009 | Suzuki et al. |
| 2010/0027064 | A1 | 2/2010 | Kimura |
| 2012/0251160 | A1 | 10/2012 | Sato |

FOREIGN PATENT DOCUMENTS

| | | |
|---|---|---|
| JP | 2007-127846 A | 5/2007 |
| JP | 2009-105557 A | 5/2009 |
| JP | 2010-102143 A | 5/2010 |
| JP | 2012-215596 A | 11/2012 |

\* cited by examiner

IMAGE FORMING APPARATUS AND OPERATING DEVICE

INCORPORATION BY REFERENCE

The present application claims priority under 35 U.S.C. §119 to Japanese Patent Application No. 2013-078431, filed Apr. 4, 2013. The contents of this application are incorporated herein by reference in their entirety.

BACKGROUND

The present disclosure relates to image forming apparatuses for forming an image on a sheet and also to operating devices.

Typically, image forming apparatuses for forming an image on a sheet is provided with an operating section for inputting image forming information. The operating section includes a display section. The display section displays thereon image forming information, such as the number of prints and the size of prints. Typically, the operating section projects forward from the main body of the image forming apparatus.

Some image forming apparatuses are of an in-body discharge type and include an in-body discharge section and an operating section. The operating section projects forward from the main body at a location above the in-body discharge section and includes a display section. In addition, to improve the operability of the operating section for users in a wheelchair, the operating section can be turned on its rear edge as the pivot to tilt its front edge downward. That is, the tilt of the operating section is variable.

SUMMARY

An image forming apparatus according to one aspect of the present disclosure includes a lower housing, an image forming section, a discharge section, an upper housing, and an operating section. The lower housing has an interior space. The image forming section is disposed in the interior space and forms an image on a sheet. The discharge section is disposed on an upper surface of the lower housing and receives the sheet discharged. The upper housing is disposed above the discharge section in spaced relation with the discharge section. The operating section projects forward from the upper housing. The operating section includes an input section and a display section. The input section receives input of image forming information. The display section is disposed adjacent to the input section and displays the image forming information thereon. A position of the display section is switchable between a first position and a second position. The first position is where the display section is flush with the input section. The second position is where the display section is tilted forward more than the input section, by turning the display section on a front edge side of the display section as a pivot to raise a rear edge side of the display section upward from the first position.

An operating device according to another aspect of the present disclosure projects forward from an upper housing of an image forming apparatus. The operating device includes an input section and a display section. The input section receives input of image forming information. The display section is disposed adjacent to the input section and displays the image forming information thereon. A position of the display section is switchable between a first position and a second position. The first position is where the display section is flush with the input section. The second position is where the display section is tilted forward more than the input section, by turning the display section on a front edge side of the display section as a pivot to raise a rear edge side of the display section upward from the first position.

DETAILED DESCRIPTION

The following describes one embodiment of the present disclosure with reference to the accompanying drawings. Note that the same or corresponding elements are denoted by the same reference signs in the figures and a description of such an element is not repeated.

Figure 1:
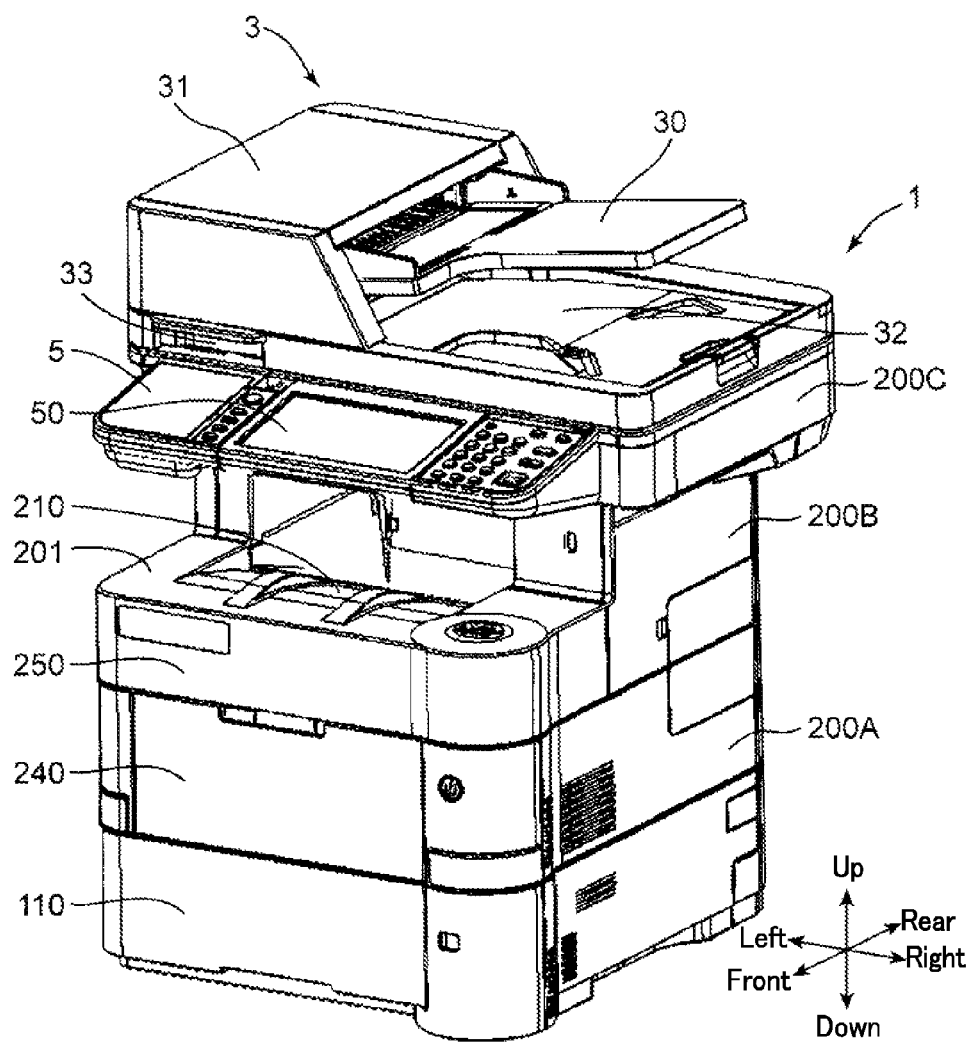
FIG. 1 is a perspective view of an image forming apparatus according to an embodiment of the present disclosure.
Figure 2:
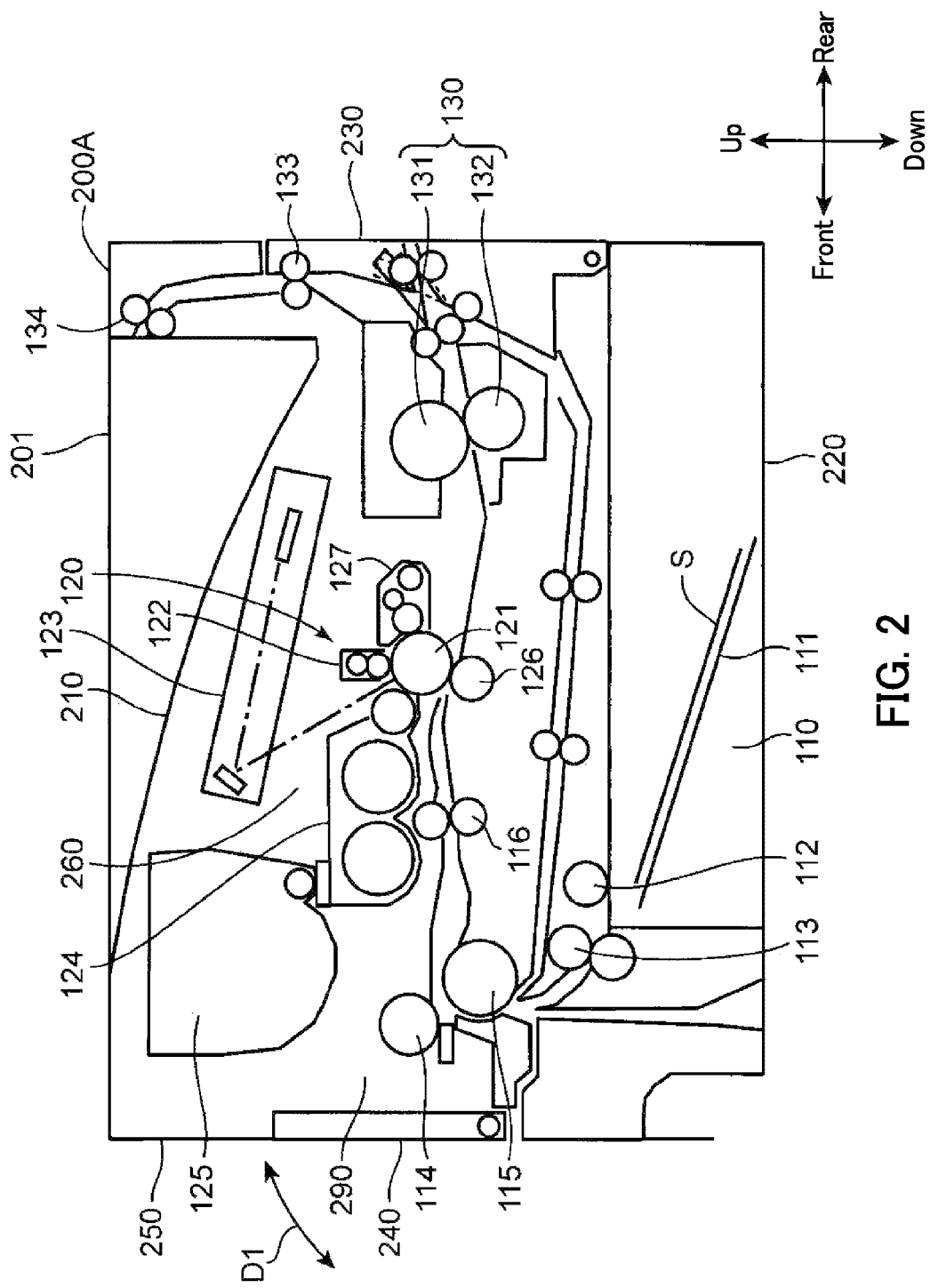
FIG. 2 is an internal cross sectional view of the image forming apparatus according to the embodiment of the present disclosure.

FIG. 1 is a perspective view of an image forming apparatus 1 according to the embodiment of the present disclosure. FIG. 2 is a cross sectional view schematically showing an internal structure of a lower housing 200A of the image forming apparatus 1 shown in FIG. 1. The image forming apparatus 1 shown in FIGS. 1 and 2 is so-called a monochrome printer. According to another embodiment, however, the image forming apparatus may be a color printer, a facsimile machine, a multifunctional peripheral having such functions, and another apparatus for forming a toner image on a sheet. Note that the terms describing the directions such as "up", "down", "front", "rear", "left", and "right" used in the description below are simply for the purpose of clarifying the description and not intended to limit the principle of the image forming apparatus.

As shown in FIG. 1, the image forming apparatus 1 includes the lower housing 200A, a connecting housing 200B, an upper housing 200C, and an automatic document reader 3.

Figure 3:
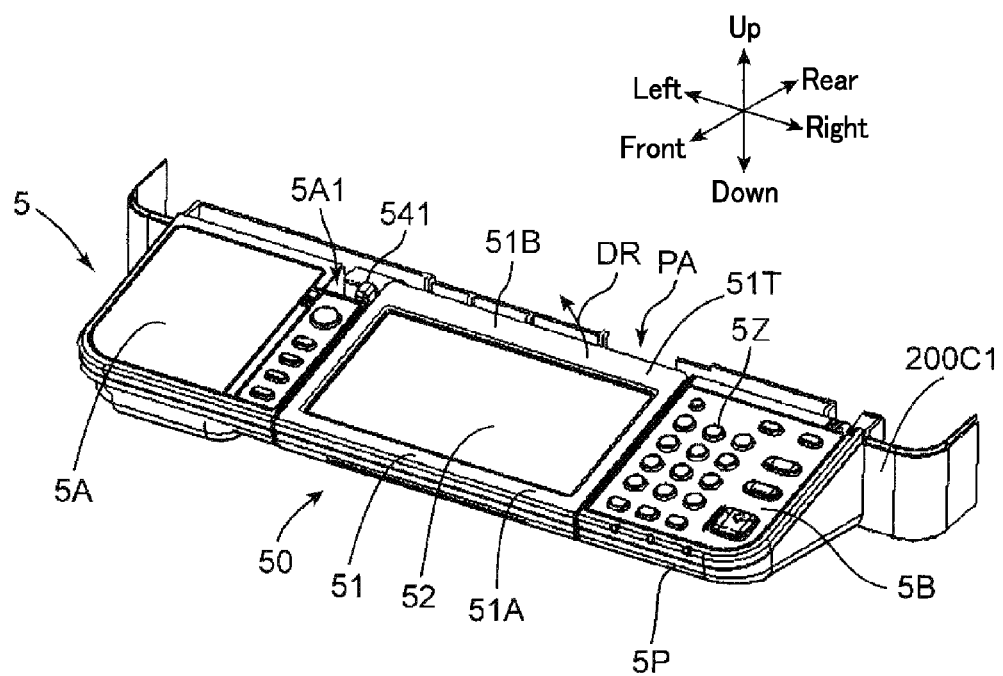
FIG. 3 is a perspective view of an operating section according to the embodiment of the present disclosure.

The lower housing 200A is disposed at a lower part of the image forming apparatus 1 and generally has a cubic shape. The lower housing 200A accommodates therein various devices for forming an image on a sheet S. The upper housing 200C is disposed above the lower housing 200A in spaced relation. The upper housing 200C has a flat rectangular parallelepiped shape. The upper housing 200C accommodates therein a reading section not shown in the figures. The front face of the upper housing 200C is defined by an upper front wall 200C1 (FIG. 3).

The connecting housing 200B connects the lower housing 200A and the upper housing 200C in the up-and-down direction along their left, right, and rear parts. The connecting housing 200B is a wall portion having a squared U-shape that is open toward the front in a top view. An in-body discharge space is formed in a region surrounded by the lower housing 200A, the connecting housing 200B, and the upper housing 200C. The bottom surface of the in-body discharge space is defined by an in-body discharge section 210 (discharge section), which will be described later.

The lower housing 200A is defined by a plurality of outer walls. The lower housing 200A includes an upper wall 201, a bottom wall 220 (FIG. 2), a rear wall 230 (FIG. 2), and a front wall 250. The upper wall 201 defines the upper surface of the lower housing 200A. The bottom wall 220 defines the bottom surface of the lower housing 200A. The rear wall 230 stands between the upper wall 201 and the bottom wall 220. The front wall 250 stands opposite the rear wall 230. The lower housing 200A has an in-body space 260 (interior space) (FIG. 2) for accommodating various devices therein.

The upper wall 201 which defines the upper surface of the lower housing 200A is centrally provided with the in-body discharge section 210. The in-body discharge section 210 has an inclined surface that is inclined downward from a front part toward a rear part of the upper wall 201. The in-body discharge section 210 receives the sheet S discharged after an image is formed thereon by an image forming section 120 (FIG. 2), which will be described later. The upper housing 200C is disposed above the in-body discharge section 210 in spaced relation with the in-body discharge section 210. At a location central of the front wall 250 in the up-and-down direction, a manual feed tray 240 is disposed. The manual feed tray 240 can be turned up and down (an arrow D1 in FIG. 2) relative to the front wall 250 on the lower edge of the manual feed tray 240 as the pivot.

The front wall 250 and a front portion of the upper wall 201 can be turned up and down integrally with the manual feed tray 240. When the upper edge of the front wall 250 is turned downward, an opening 290 (FIG. 2) formed in the lower housing 200A opens up. The opening 290 is in communication with the in-body space 260 (FIG. 2) of the lower housing 200A. The user can access the various devices accommodated in the in-body space 260 of the lower housing 200A through the opening 290. When the upper edge of the front wall 250 is turned upward, the opening 290 closes off. As a result, unnecessary access by the user to the in-body space 260 is prevented.

As shown in FIG. 2, the image forming apparatus 1 includes a cassette 110, a pickup roller 112, a first paper-feed roller pair 113, a second paper-feed roller 114, a conveyance roller 115, a registration roller pair 116, and the image forming section 120.

The cassette 110 is loaded with sheets S. The cassette 110 includes a lift plate 111 for supporting the sheets S. The lift plate 111 is inclined to push the leading edge of the sheets S upward.

The pickup roller 112 comes into contact with the leading edge of the top-most sheet S pushed upward by the lift plate 111. When the pickup roller 112 rotates, the top-most sheet S is pulled out from the cassette 110.

The first paper-feed roller pair 113 is disposed downstream from the pickup roller 112 in the conveyance direction of the sheets S (hereinafter, referred to as "sheet conveyance direction"). The first paper-feed roller pair 113 feeds the sheet S further downstream. The second paper-feed roller 114 is disposed near the pivot of the manual feed tray 240. The second paper-feed roller 114 pulls a sheet S on the manual feed tray 240 into the lower housing 200A. The user can selectively use sheet(s) S loaded in the cassette 110 or sheet(s) S placed on the manual feed tray 240.

The conveyance roller 115 is disposed downstream from the first paper-feed roller pair 113 and the second paper-feed roller 114 in the sheet conveyance direction. The conveyance roller 115 conveys the sheet S fed by the first paper-feed roller pair 113 or the second paper-feed roller 114 to further downstream.

The registration roller pair 116 regulates the position of the sheet S in the sheet conveyance direction. As a result, the position of an image to be formed on the sheet S is adjusted. The registration roller pair 116 feeds the sheet S to the image forming section 120 in timed relation to the image formation by the image forming section 120.

The image forming section 120 is disposed in the in-body space 260. The image forming section 120 forms an image on the sheet S. The image forming section 120 includes a photosensitive drum 121, an electrostatic charger 122, an exposing device 123, a developing device 124, a toner container 125, a transfer roller 126, and a cleaning device 127.

The photosensitive drum 121 has the shape of a cylinder. The photosensitive drum 121 has a peripheral surface on which an electrostatic latent image is formed. The photosensitive drum 121 bears a toner image conforming to the electrostatic latent image. More specific details are as follows.

A prescribed voltage is applied to the electrostatic charger 122. Then, the electrostatic charger 122 charges the peripheral surface of the photosensitive drum 121 substantially uniformly.

The exposing device 123 irradiates, with laser light, the peripheral surface of the photosensitive drum 121 charged by the electrostatic charger 122. The laser light irradiation is performed according to image data that is output from an external device (not shown), such as a personal computer connected to enable communications with the image forming apparatus 1. As a result, an electrostatic latent image corresponding to the image data is formed on the peripheral surface of the photosensitive drum 121.

The developing device 124 supplies toner to the peripheral surface of the photosensitive drum 121 bearing the electrostatic latent image formed thereon. The toner container 125 supplies toner to the developing device 124. The toner container 125 supplies toner to the developing device 124 successively or as needed. When the developing device 124 supplies toner to the photosensitive drum 121, the electrostatic latent image formed on the peripheral surface of the photosensitive drum 121 is developed (visualized). As a result, the toner image is formed on the peripheral surface of the photosensitive drum 121.

The transfer roller 126 is disposed to be rotatable while staying in contact with the peripheral surface of the photosensitive drum 121. When the sheet S conveyed from the registration roller pair 116 passes between the photosensitive drum 121 and the transfer roller 126, the toner image formed on the peripheral surface of the photosensitive drum 121 is transferred to the sheet S.

The cleaning device 127 removes toner remaining on the peripheral surface of the photosensitive drum 121 after the toner image is transferred to the sheet S. The peripheral surface of the photosensitive drum 121 as cleaned by the cleaning device 127 is again passes below the electrostatic charger 122 to be uniformly charged. Thereafter, the toner image formation described above is newly carried out.

The image forming apparatus 1 further includes a fixing device 130 at a location downstream from the image forming section 120 in the sheet conveyance direction. The fixing device 130 fixes an unfixed toner image on the sheet S onto the sheet S. The fixing device 130 includes a heating roller 131 for fusing the toner on the sheet S and a pressure roller 132 for placing the sheet S into intimate contact with the heating roller 131. When the sheet S passes between the heating roller 131 and the pressure roller 132, the unfixed toner image is fixed onto the sheet S.

The image forming apparatus 1 further includes a plurality of conveyance roller pairs 133 and a discharge roller pair 134 (discharge member). The conveyance roller pairs 133 are disposed downstream from the fixing device 130 in the sheet conveyance direction. The discharge roller pair 134 is disposed downstream from the conveyance roller pairs 133 in the sheet conveyance direction. The sheet S is conveyed upward by the conveyance roller pairs 133 and ultimately discharged by the discharge roller pair 134 from the lower housing 200A. The sheet S discharged from the lower housing 200A is stacked on another sheet S in the in-body discharge section 210.

As shown in FIG. 1, the automatic document reader 3 can be opened relative to the contact glass (not shown) disposed in the upper surface of the upper housing 200C. The automatic document reader 3 is opened by turning it on the rear edge portion of the automatic document reader 3 as the pivot to raise the front portion of the automatic document reader 3 upward. An original document sheet is placed on the contact glass when the automatic document reader 3 is in the open state. In addition, the automatic document reader 3 conveys the original document sheet to an image reading position on the contact glass.

The automatic document reader 3 includes a document tray 30, a document conveyance section 31, and a document discharge section 32. On the document tray 30, an original document sheet is placed. The document conveyance section 31 conveys the original document sheet placed on the document tray 30 to the image reading position and then discharges the original document sheet to the document discharge section 32. The document conveyance section 31 is provided with a handle section 33 at a lower position on the front face. The handle section 33 is used for opening and closing the automatic document reader 3.

The image forming apparatus 1 further includes an operating section 5. The operating section 5 functions as an operating device. The operating section 5 projects forward from the upper front wall 200C1 of the upper housing 200C. According to the present embodiment, the front edge of the operating section 5 is located rearward from the front wall 250 (front edge) of the lower housing 200A in the front-to-rear direction. The operating section 5 is disposed above the in-body discharge section 210 in spaced relation with the in-body discharge section 210. Next, with reference to FIGS. 3-11, the operating section 5 according to the present embodiment will be described in greater detail.

Figure 4:
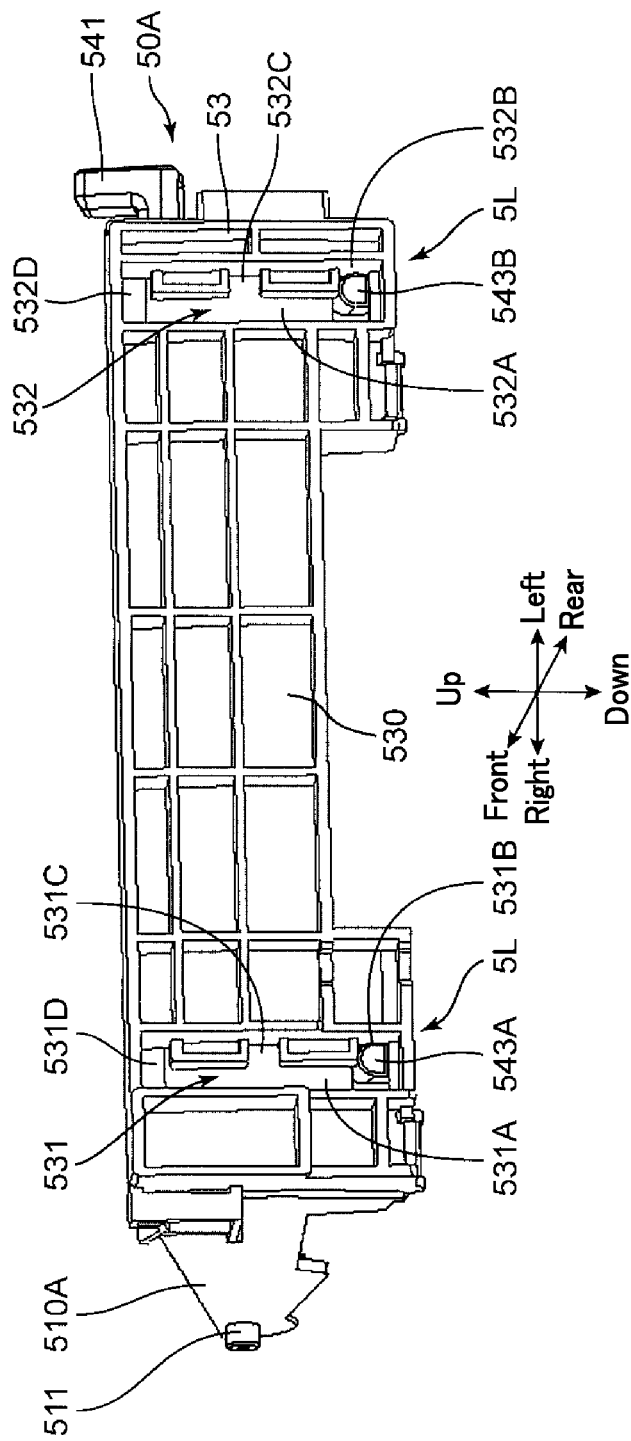
FIG. 4 is a perspective view of the display section and a guide section according to the embodiment of the present disclosure, as seen from the rear.
Figure 5:
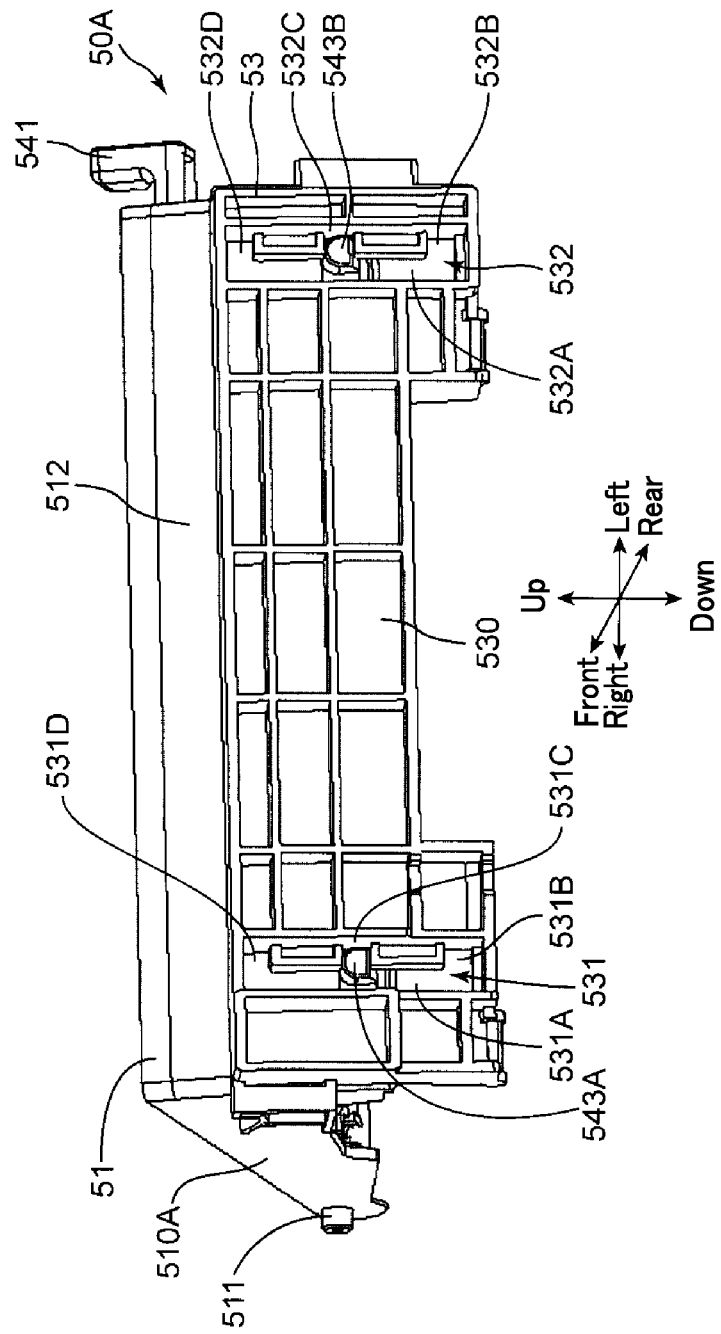
FIG. 5 is a perspective view of the display section and the guide section according to the embodiment of the present disclosure, as seen from the rear.
Figure 6:
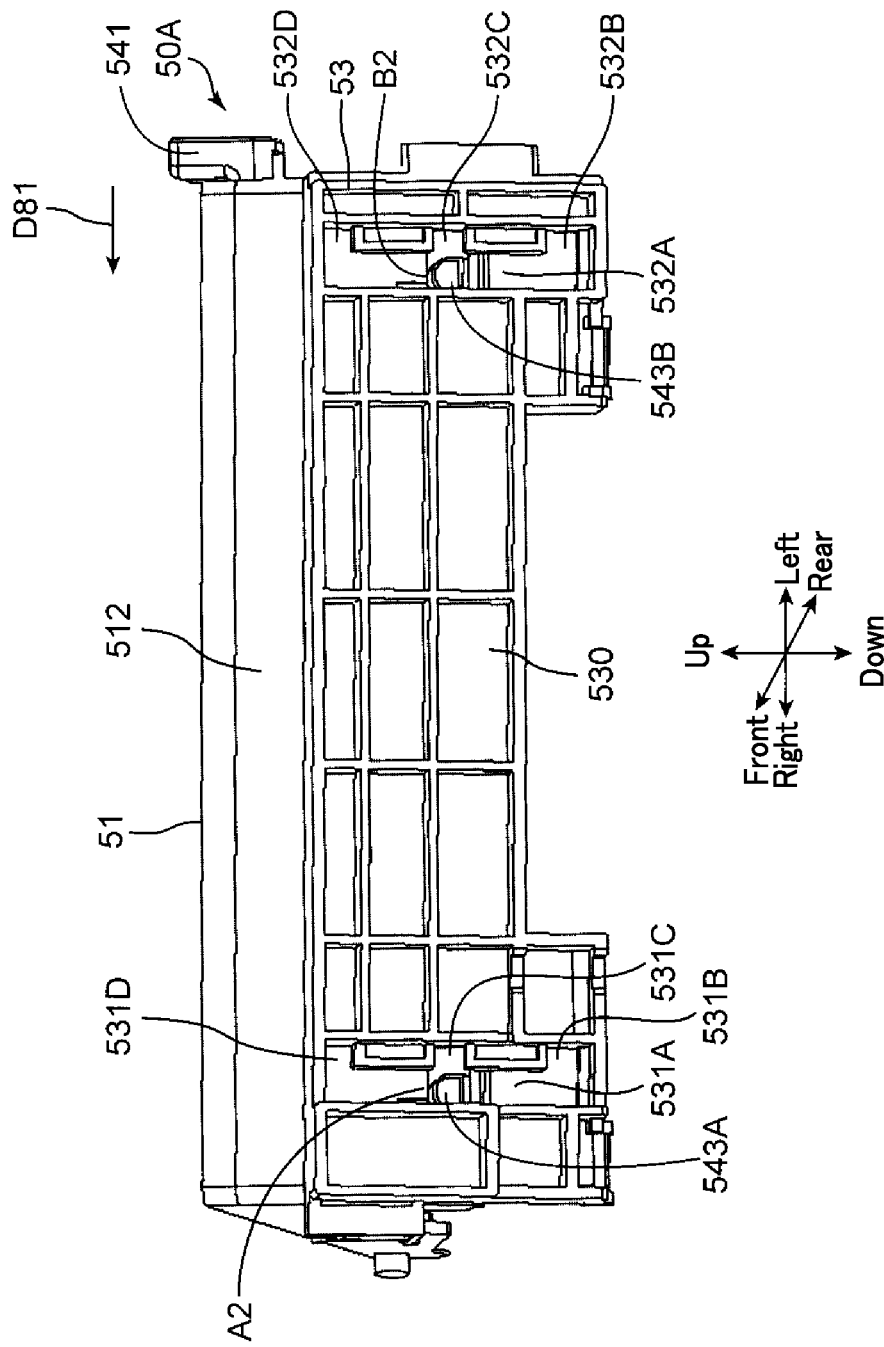
FIG. 6 is a perspective view of the display section and the guide section according to the embodiment of the present disclosure, as seen from the rear.
Figure 7:
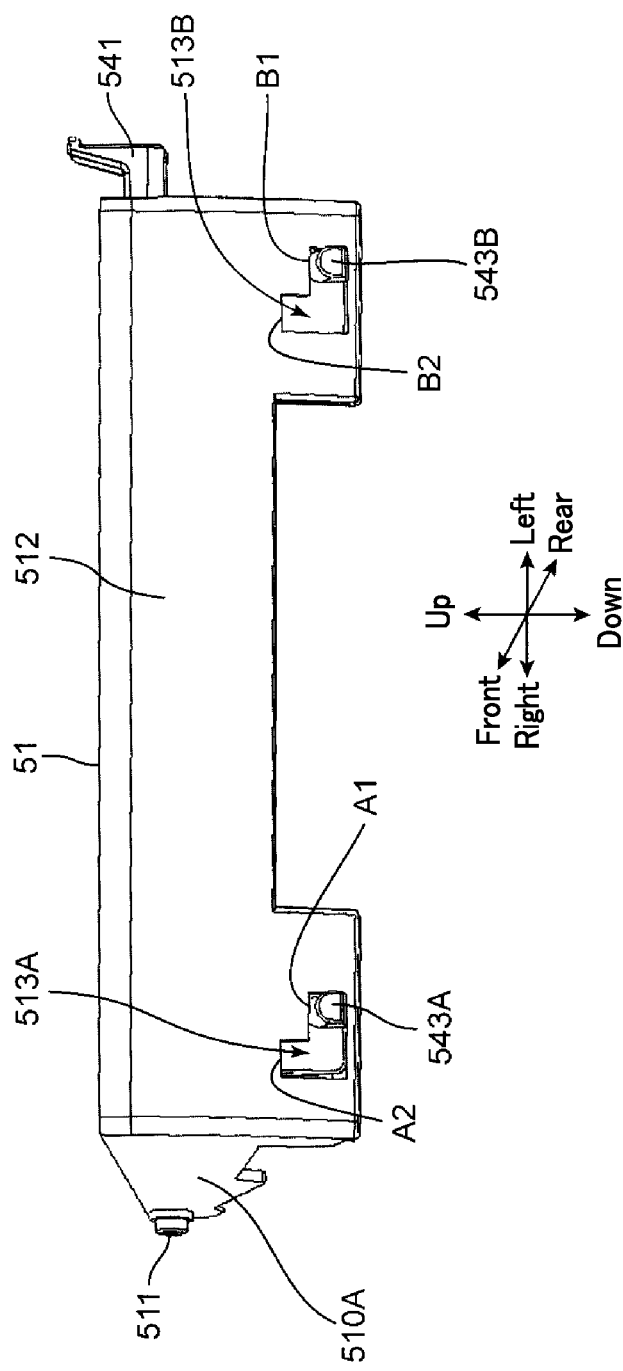
FIG. 7 is a perspective view of the display section according to the embodiment of the present disclosure, as seen from the rear.
Figure 8:
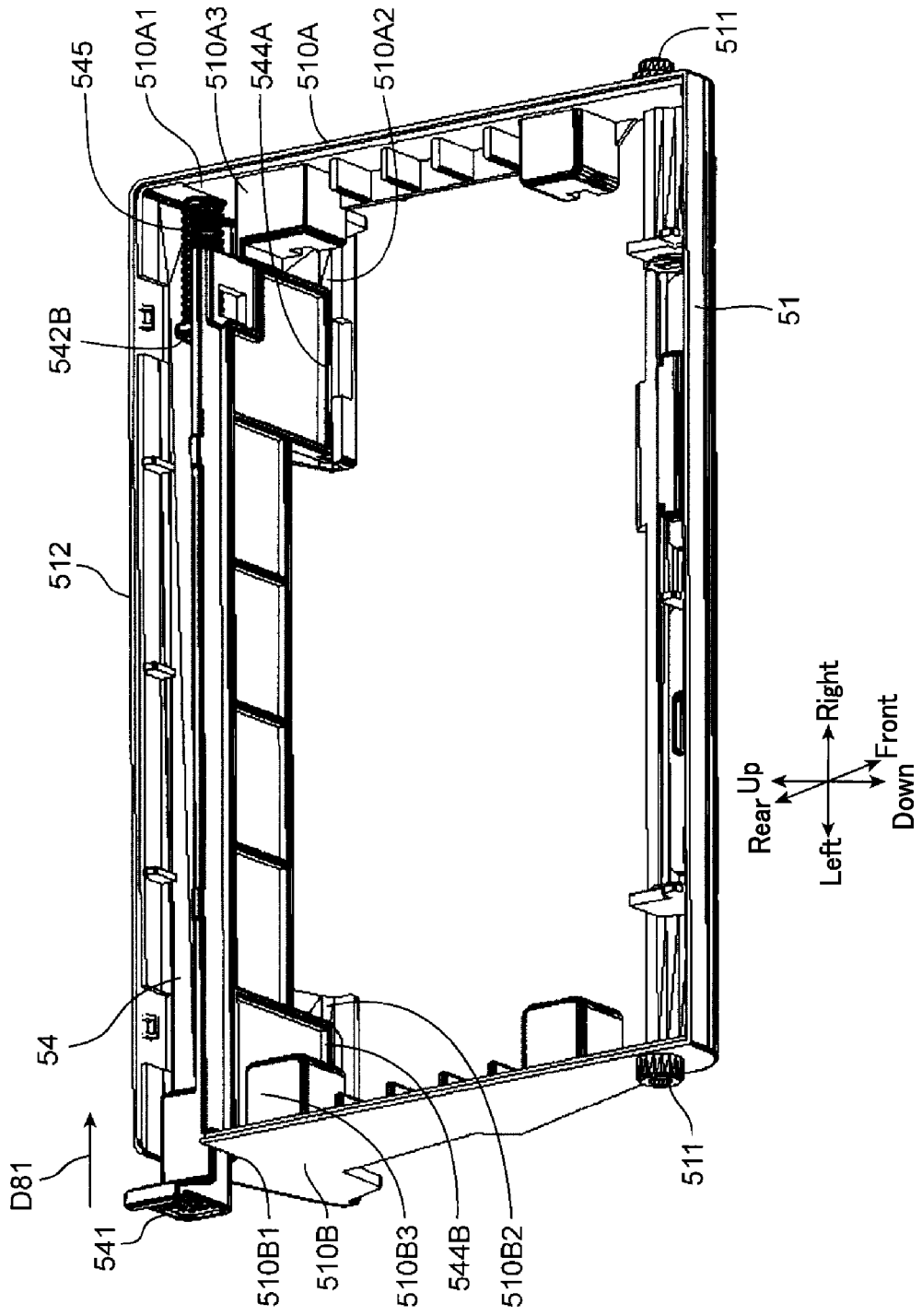
FIG. 8 is a perspective view showing an interior of the display section according to the embodiment of the present disclosure.
Figure 9:
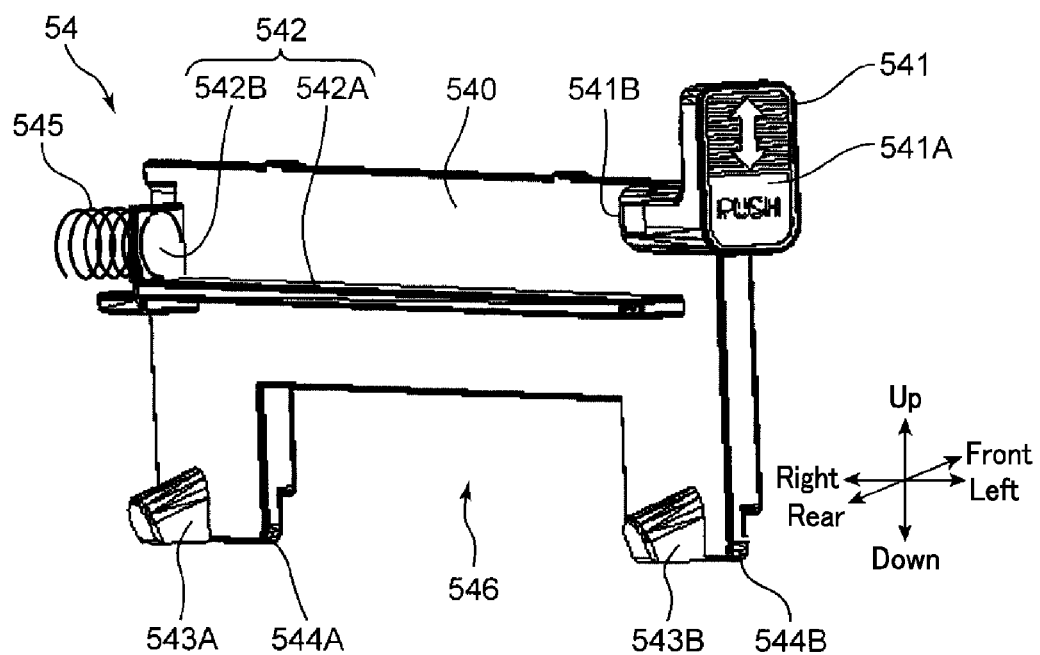
FIG. 9 is a perspective view of a moving member according to the embodiment of the present disclosure.
Figure 10:
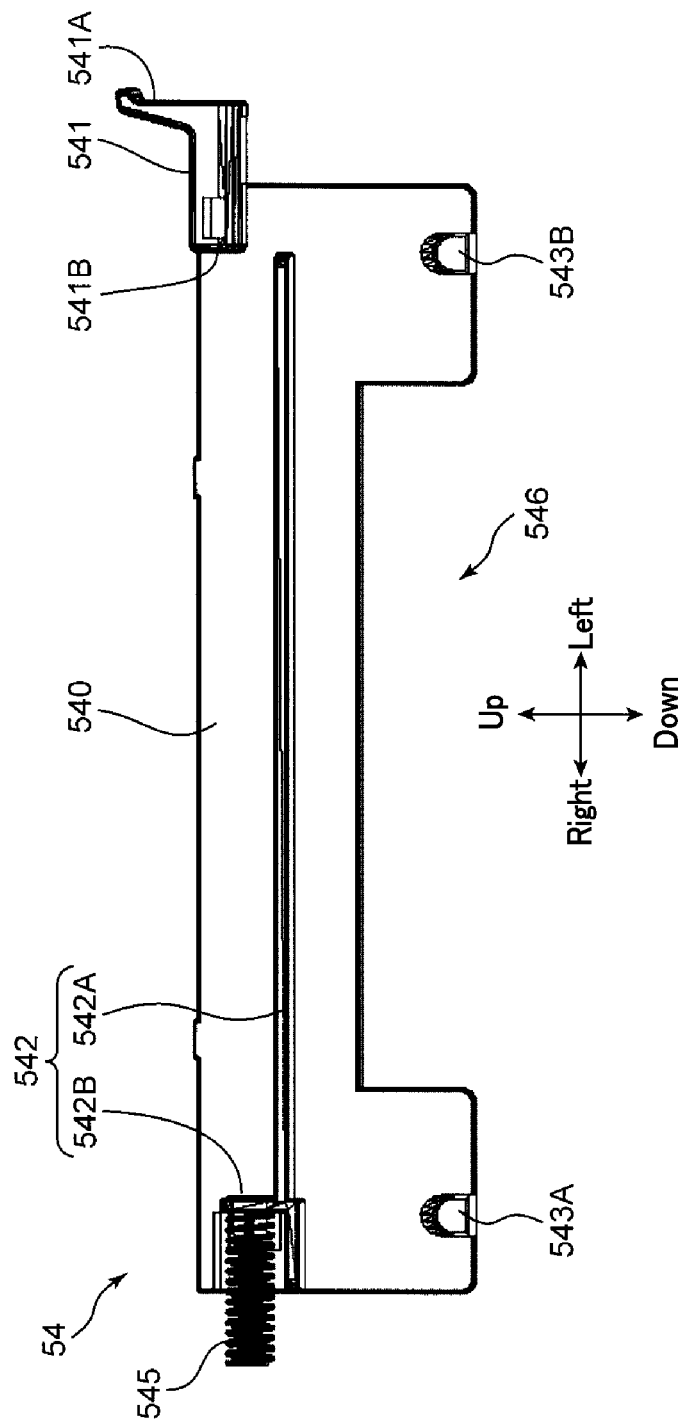
FIG. 10 is a rear view of the moving member according to the embodiment of the present disclosure.
Figure 11:
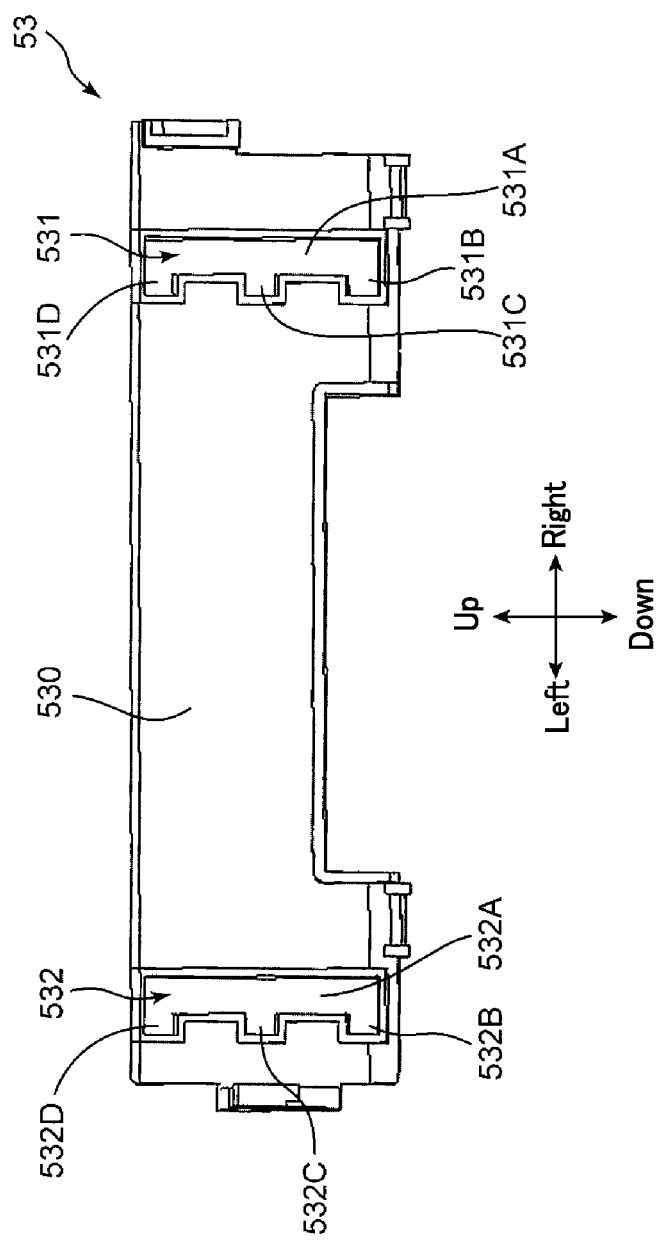
FIG. 11 is a front view of the guide section according to the embodiment of the present disclosure.
Figure 12:
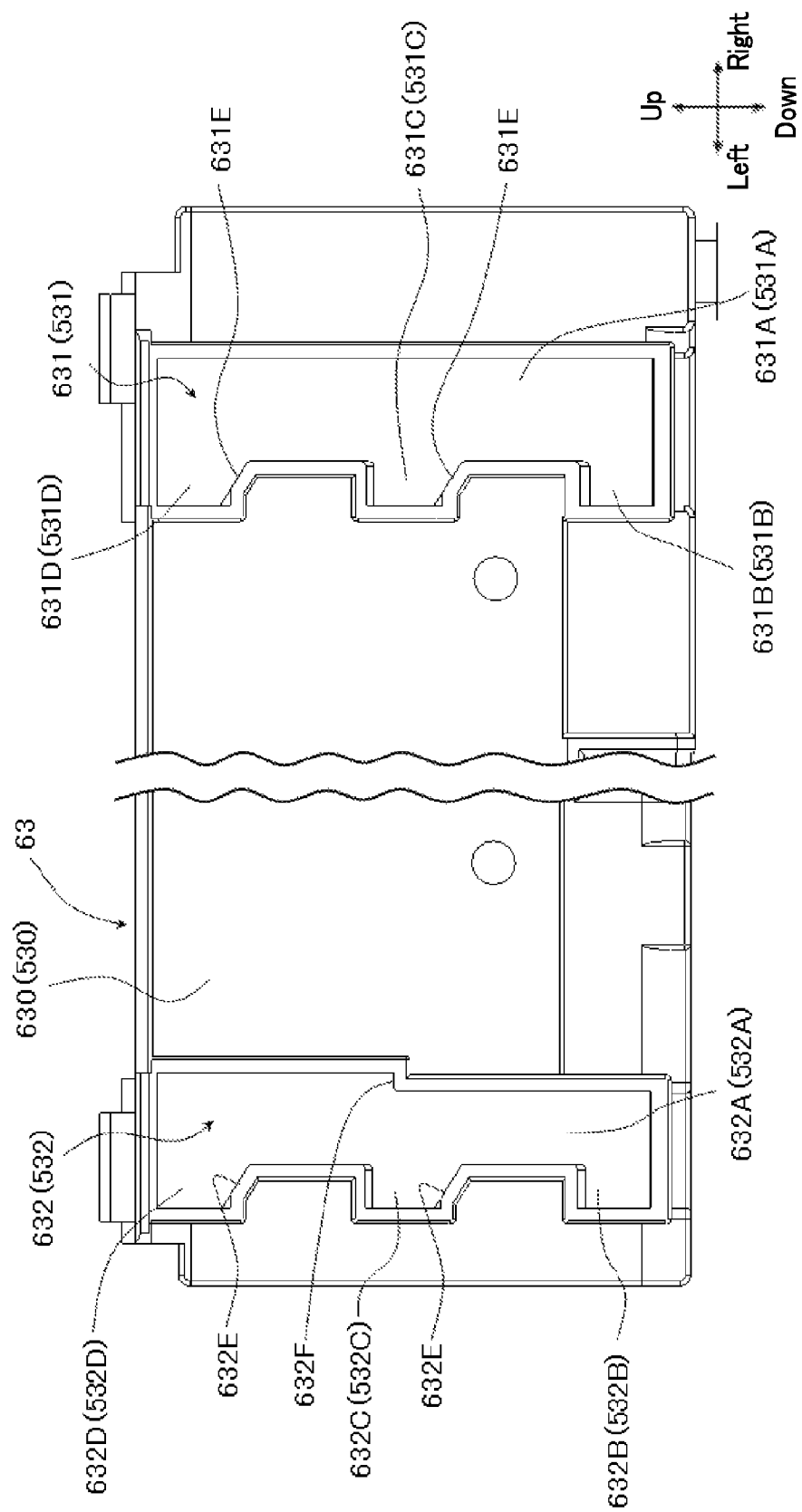
FIG. 12 is a front view of a guide section according to a modification of the embodiment of the present disclosure.
Figure 13:
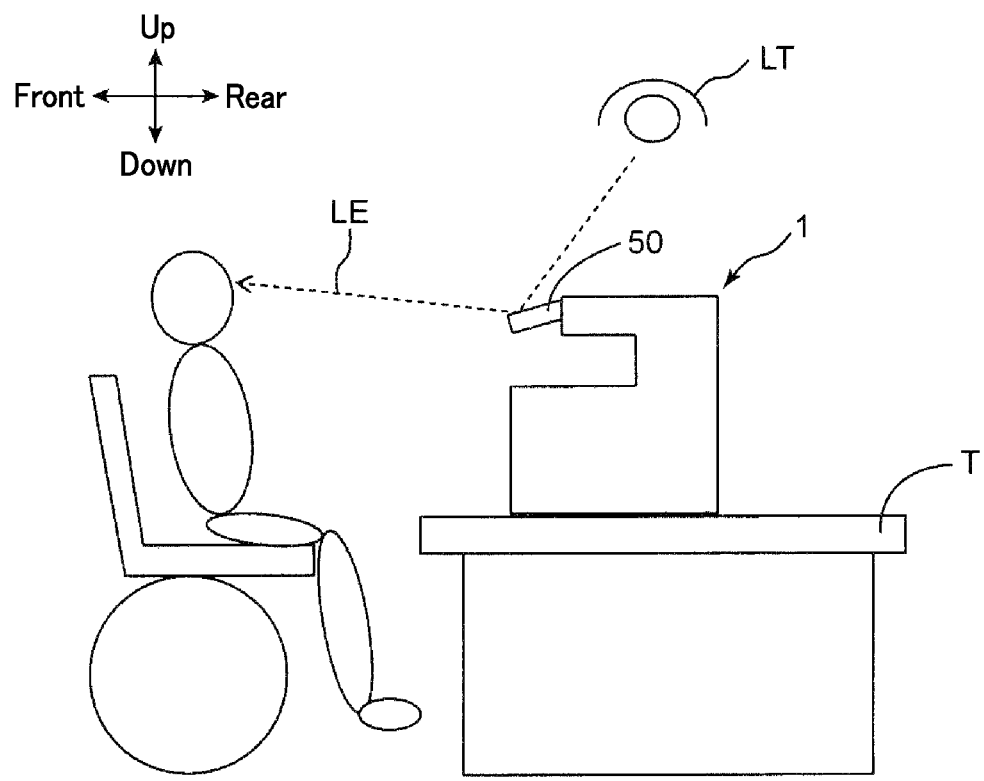
FIG. 13 is a side view schematically showing how light of a fluorescent lamp enters into a display panel according to the embodiment of the present disclosure.

FIG. 3 is a perspective view of the operating section 5 according to the embodiment of the present disclosure. FIGS. 4-6 are perspective views each showing a display section 50 and a guide section 53 according to the present embodiment, as seen from the rear. FIG. 7 is a perspective view showing the display section 50 according to the present embodiment, as seen from the rear. FIG. 8 is a perspective view showing an interior of the display section 50. Note that FIG. 8 shows the state where a top plate 51T of a display frame 51 is detached from the display section 50. FIG. 9 is a perspective view of a moving member 54 according to the embodiment of the present disclosure. FIG. 10 is a rear view of the moving member 54. FIG. 11 is a front view of the guide section 53 according to the embodiment of the present disclosure. FIG. 12 is a front view of a guide section 53 according to a modification of the embodiment of the present disclosure. FIG. 13 is a side view schematically showing how light of a fluorescent lamp LT enters into a display panel 52 when the image forming apparatus 1 is in use.

As shown in FIG. 3, the operating section 5 is a unit that is flat in the right-and-left direction along the upper front wall 200C 1 of the upper housing 200C (FIG. 1). The operating section 5 includes a left operating section 5A, the display section 50, and a right operating section 5B (input section). The left operating section 5A and the right operating section 5B are used by the user of the image forming apparatus 1 to input various pieces of image forming information, such as the number of sheets S or the size of sheets S. That is, the left operating section 5A and the right operating section 5B input the image forming information.

The display section 50 is disposed between the left operating section 5A and the right operating section 5B to be adjacent to the left operating section 5A and the right operating section 5B. The right operating section 5B includes a plurality of buttons 5Z used to input the image forming information. The display section 50 includes the display frame 51 (frame section) and the display panel 52. The display frame 51 has a rectangular shape with a prescribed width in the right-and-left direction. The display panel 52 is disposed in the display frame 51. In one example, the display panel 52 is a liquid crystal panel fitted in the display frame 51. In another example, the display panel 52 is a touch panel. The display panel 52 displays the image forming information thereon. The operating section 5 further includes a support frame 5P. The supporting frame 5P supports the left operating section 5A, the display section 50, and the right operating section 5B from beneath.

According to the present embodiment, the position of the display section 50 can be switched between a first position and a second position. The first position is where the display section 50 is substantially flush with the right operating section 5B. Therefore, the tilt angle formed between the display section 50 in the first position and a horizontal plane is substantially equal to the tilt angle formed between the right operating section 5B and the horizontal plane. The second position is where the display section 50 is tilted forward more than the right operating section 5B by turning the display section 50 on its front edge portion 51A (front edge side) as the pivot so as to raise a rear edge portion 51B (rear edge side) of the display section 50 upward from the first position (as indicated by an arrow DR shown in FIG. 3). Therefore, the tilt angle formed between the display section 50 in the second position and the horizontal plane is greater than the tilt angle formed between the right operating section 5B and the horizontal plane. As a result, the tilt of the display surface of the display panel 52 of the display section 50 is closer to the vertical when the display section 50 is in the second position than in the first position. FIGS. 3 and 4 show the state in which the display section 50 is in the first position, and FIG. 5 shows the state in which the display section 50 is in the second position.

According to the present embodiment, the display section 50 is turnable on the front edge portion 51A as the pivot. Therefore, the frond edge portion 51A of the display section 50 does not close the in-body discharge section 210 (FIG. 1) located below the operating section 5 regardless of the position switching of the display section 50. This ensures to appropriately maintain the visibility of, and the accessibility to the sheets S discharged to the in-body discharge section 210. Further, the display section 50 is turnable separately from the left operating section 5A and the right operating section 5B. Consequently, as shown in FIG. 13, the image forming information presented on the display section 50 is stably visible to users in various positions, including those in a wheelchair.

As shown in FIG. 13, in addition, even if light LE of a fluorescent lamp LT (electric light) enters into the display panel 52 of the display section 50 depending on the installation environment of the image forming apparatus 1, the visibility of the display panel 52 can be appropriately ensured by switching the position of the display section 50 between the first position and the second position. In the case in particular where the image forming apparatus 1 is a compact desktop-type image forming apparatus and installed on a table as shown in FIG. 13, light entering into the display section 50 tends to impair the operability especially for users in a wheelchair, although input operations to the left operating section 5A and the right operating section 5B may still be made without difficulty. Therefore, by allowing the tilt of the display section 50 to be independently variable as described above, the operability of the operating section 5 is appropriately maintained for users including those in a wheelchair.

As shown in FIGS. 1 and 2, the discharge roller pair 134 causes the sheet S having an image formed thereon to be discharged to the in-body discharge section 210 in a direction from the rear to the front. The front edge of the operating section 5 is located rearward from the front edge of the lower housing 200A in the front-to-rear direction. As compared with the case where the sheet S is discharged in the right-and-left direction, the sheet S being discharged is appropriately visible to the users from a position lower than the operating section 5. Since the front edge of the operating section 5 does not project beyond the front edge of the lower housing 200A, the visibility of the sheet S is even better when the in-body discharge section 210 is seen by the users from a position higher than the operating section 5.

Next, the following describes a moving mechanism of the display section 50 according to the present embodiment. As shown in FIGS. 4-6, the operating section 5 is provided with a moving mechanism section 50A. The moving mechanism section 50A moves the display section 50 between the first position and the second position. In addition, the moving mechanism section 50A secures the display section 50 in the second position at a plurality of tilt angles in a stepwise manner.

With reference to FIGS. 7 and 8, the display frame 51 includes the top plate 51T (FIG. 3), a right-side wall 510A, a left-side wall 510B, a pair of rotating shafts 511, and a rear wall 512. The top plate 51T corresponds to the upper surface of the display frame 51. The display panel 52 (FIG. 3) is fitted in an opening (not shown) in the top plate 51T. The right-side wall 510A and the left-side wall 510B are respectively contiguous with the right edge and the left edge of the top plate 51T. The right-side wall 510A and the left-side wall 510B make up a pair of side walls.

The pair of rotating shafts 511 is made up of two shafts extending in the right-to-left direction, one from the front edge portion of the right-side wall 510A and the other from the front edge portion of the left-side wall 510B. The rotating shafts 511 collectively function as the pivot on which the display section 50 turns. The display frame 51 of the display section 50 turns on the rotating shafts 511 as the pivot relatively to the supporting frame 5P (FIG. 3) of the operating section 5, which places the display section 50 in either the first position or the second position. Therefore, the lower portion of the display section 50 is supported by the supporting frame 5P at all times. This eliminates the need for the supporting frame 5P supporting the display section 50 from beneath to have a separate portion, which is different from a structure in which a portion of the supporting frame 5P turns together with the display section 50 on the rotating shafts 511 as the pivot. As a consequence, the strength of the operating section 5 is appropriately maintained. Note that the respective rotating shafts 511 in the pair are passed through a through hole in the left operating section 5A and a through hole in the right operating section 5B (neither of the through holes is shown in the figures). The rear wall 512 corresponds to the rear surface of the display frame 51. The rear wall 512 connects the rear edge of the right-side wall 510A and the rear edge of the left-side wall 510B in the right-and-left direction.

The right-side wall 510A includes a spring abutment portion 510A1, a right guide groove 510A2, and a right regulation portion 510A3. The spring abutment portion 510A1 corresponds to the rear edge portion of the inner wall surface of the right-side wall 510A. The spring abutment portion 510A1 is where a biasing spring 545, which will be described later, abuts at its right end. The right guide groove 510A2 projects toward the left from the lower edge portion of the spring abutment portion 510A1. The right guide groove 510A2 extends in the right-and-left direction. The right guide groove 510A2 is for slidably receiving a first lower edge portion 544A of the moving member 54, which will be described later. The right regulation portion 510A3 is a boxlike projection that projects toward the left from the inner wall surface of the right-side wall 510A at a location forward of the spring abutment portion 510A1. The right regulation portion 510A3 has a function of preventing detachment of the moving member 54, which will be described later, in the forward direction.

Likewise, the left-side wall 510B includes a cutaway portion 510B1, a left guide groove 510B2, and a left regulation portion 510B3. The cutaway portion 510B1 is formed by cutting away an upper rear portion of the left-side wall 510B in a rectangular shape. The cutaway portion 510B1 is for receiving an operation button 541, which will be described later, therethrough. The left guide groove 510B2 projects toward the right from the inner wall surface of the left-side wall 510B at a location below the cutaway portion 510B1. The left guide groove 510B2 extends in the right-and-left direction. The left guide groove 510B2 is for slidably receiving a second lower edge portion 544B of the moving member 54, which will be described later. The left guide groove 510B3 is a boxlike projection that projects toward the right from the inner wall surface of the left-side wall 510B at a location forward of the cutaway portion 510B1. The left regulation portion 510B3 has a function of preventing detachment of the moving member, 54 which will be described later, in the forward direction.

The rear wall 512 has a first opening 513A and a second opening 513B (both shown in FIG. 7). The first opening 513A and the second opening 513B are both located in a lower edge portion of the rear wall 512 and each near a corresponding one of the side edges of the rear wall 512 opposed in the right-and-left direction. As shown in FIG. 7, the first opening 513A and the second opening 513B each have a general L shape in the rear view of the rear wall 512. The first opening 513A and the second opening 513B are respectively for receiving a first engaging piece 543A and a second engaging piece 543B of the later-described moving member 54 therethrough. The first engaging piece 543A and the second engaging piece 543B each extend toward the rear.

As shown in FIGS. 4-6 and 8, the moving mechanism section 50A includes the guide section 53 (guide plate) and the moving member 54.

The guide section 53 is secured to the upper front wall 200C1 (FIG. 3) of the upper housing 200C. The guide section 53 is disposed opposite the rear wall 512 of the display frame 51. Note that FIGS. 4-6 show the guide section 53 located behind the display frame 51 and omit the upper housing 200C (upper front wall 200C1). In addition, the guide section 53 is located at a region PA shown in FIG. 3, although the guide section 53 is not shown in FIG. 3. With reference to FIGS. 4 and 11, the guide section 53 includes a guide panel 530, a first guide section 531, and a second guide section 532.

The guide panel 530 corresponds to a main body of the guide section 53. The guide panel 530 is a member in the form of plate extending in both the up-and-down direction and the right-and-left direction. The guide panel 530 has a lower edge portion that is partly cut away to define a general shape of a squared U.

The first guide section 531 and the second guide section 532 (a pair of guide grooves) correspond to a pair of openings and formed along the sides of the guide panel 530 opposed in the right-and-left direction. The first guide section 531 and the second guide section 532 are respectively for receiving the first engaging piece 543A and the second engaging piece 543B (together corresponding to a pair of guide pins) of the later-described moving member 54 therethrough, in a manner to allow the respective engaging pieces 543A and 543B to move in the up-and-down direction and the right-and-left direction. The first guide section 531 and the second guide section 532 function as part of a pair of lock sections 5L, which will be described later.

As shown in FIG. 4, the first guide section 531 is an opening that defines a general E shape in the rear view of the guide section 53. The first guide section 531 includes a first move groove 531A (movement-enabling groove), a 1-1 engagement groove 531B (engagement-enabling groove), a 1-2 engagement groove 531C (engagement-enabling groove), and a 1-3 engagement groove 531D (engagement-enabling groove). The first move groove 531A is an opening that is part of the first guide section 531 and that is elongated in the up-and-down direction. As the display section 50 is moved between the first position and the second position, the later-described first engaging piece 543A moves up and down within the first move groove 531A.

The 1-1 engagement groove 531B, the 1-2 engagement groove 531C, and the 1-3 engagement groove 531D extend toward the left (in the biasing direction of the later-described biasing spring 545) continuously from a plurality of locations (three locations in the present embodiment) of the first move groove 531A arranged in the up-and-down direction. When the display section 50 is secured in either the first position or the second position, the first engaging piece 543A engages with a corresponding one of the 1-1 engagement groove 531B, the 1-2 engagement groove 531C, and the 1-3 engagement groove 531D. The 1-1 engagement groove 531B is continuous with the lower end of the first move groove 531A. The 1-2 engagement groove 531C is continuous with a central portion of the first move groove 531A in the up-and-down direction. The 1-3 engagement groove 531D is continuous with the upper end of the first move groove 531A.

When the display section 50 is in the first position, the later-described first engaging piece 543A engages with the 1-1 engagement groove 531B. When the display section 50 is in the second position, the later-described first engaging piece 543A engages with the 1-2 engagement groove 531C or the 1-3 engagement groove 531D. The tilt angle of the display section 50 is larger when the first engaging piece 543A is in engagement with the 1-3 engagement groove 531D than with the 1-2 engagement groove 531C.

Likewise, as shown in FIG. 4, the second guide section 532 is an opening that defines a general E shape in the rear view of the guide section 53. The second guide section 532 includes a second move groove 532A (movement-enabling groove), a 2-1 engagement groove 532B (engagement-enabling groove), a 2-2 engagement groove 532C (engagement-enabling groove), and a 2-3 engagement groove 532D (engagement-enabling groove). The second move groove 532A is an opening that is part of the second guide section 532 and that is elongated in the up-and-down direction. As the display section 50 is moved between the first position and the second position, the later-described second engaging piece 543B moves up and down within the second move groove 532A.

The 2-1 engagement groove 532B, the 2-2 engagement groove 532C, and the 2-3 engagement groove 532D extend toward the left (in the biasing direction of the later-described biasing spring 545) continuously from a plurality of locations (three locations in the present embodiment) of the second move groove 532A arranged in the up-and-down direction. When the display section 50 is secured in either the first position or in the second position, the second engaging piece 543B engages with a corresponding one of the 2-1 engagement groove 532B, the 2-2 engagement groove 532C, and the 2-3 engagement groove 532D. The 2-1 engagement groove 532B is continuous with the lower end of the second move groove 532A. The 2-2 engagement groove 532C is continuous with the central portion of the second move groove 532A in the up-and-down direction. The 2-3 engagement groove 532D is continuous with the upper end of the second move groove 532A.

When the display section 50 is in the first position, the later-described second engaging piece 543B engages with the 2-1 engagement groove 532B. When the display section 50 is in the second position, the later-described second engaging piece 543B engages with the 2-2 engagement groove 532C or the 2-3 engagement groove 532D. The tilt angle of the display section 50 is larger when the second engaging piece 543B is in engagement with the 2-3 engagement groove 532D than with the 2-2 engagement groove 532C.

With reference to FIGS. 8-10, the moving member 54 is disposed in the display frame 51 (FIG. 8) of the display section 50 at a location along the rear edge of the display section 50. The moving member 54 includes a moving panel 540, the operation button 541 (push button), a ridge portion 542, the first engaging piece 543A, the second engaging piece 543B (the first and second engaging pieces 543A and 543B together form a pair of guide pins), the first lower edge portion 544A, the second lower edge portion 544B, and the biasing spring 545.

The moving panel 540 corresponds to a main body of the moving member 54. The moving panel 540 is disposed inwardly of the rear wall 512 of the display frame 51. The moving panel 540 is a member in the form of plate extending in both the up-and-down direction and the right-and-left direction. The moving panel 540 has a lower edge portion that is partly cut away to define a general shape of a squared U in the rear view. The moving panel 540 has a moving-panel cutaway portion 546 along its lower edge. The moving-panel cutaway portion 546 is formed by cutting away a portion along the lower edge of the moving panel 540 in a rectangular shape. The moving-panel cutaway portion 546 receives electric wiring (not shown) therethrough. The electric wiring is extended from the display panel 52 of the display section 50 and coupled to a connector section (not shown) disposed in the upper housing 200C.

The operation button 541 is disposed in the display section 50. Specifically, the operation button 541 is disposed at the upper left portion of the moving panel 540 of the display section 50. As shown in FIG. 10, the operation button 541 has a general L shape in the rear view. The operation button 541 includes a push portion 541A and a base end portion 541B. The push portion 541A is disposed at the left end of the operation button 541 and pushed or held toward the right by the user of the image forming apparatus 1. The base end portion 541B is disposed at the right end of the operation button 541 and coupled to the moving panel 540. As will be described later, when a force pushing the operation button 541 is applied, the display section 50 is allowed to be moved between the first position and the second position. When the force pushing the operation button 541 is released, the display section 50 is locked either in the first position or the second position.

The ridge portion 542 is a member in the form of plate projecting toward the rear from the moving panel 540. The ridge portion 542 includes a horizontal ridge portion 542A and a spring anchoring portion 542B. The horizontal ridge portion 542A extends in the right-and-left direction along the central portion of the moving panel 540 in the up-and-down direction. The spring anchoring portion 542B extends upward from the right edge of the horizontal ridge portion 542A. The spring anchoring portion 542B faces in the right-and-left direction. The later-described biasing spring 545 is anchored at its left end to the spring anchoring portion 542B.

The first engaging piece 543A and the second engaging piece 543B are projections making up a pair and project toward the rear from the respective lower edge portions of the moving panel 540, which are the two side portions opposed in the right-and-left direction. The first engaging piece 543A and the second engaging piece 543B are spaced apart from each other in the right-and-left direction. As will be described later, the first engaging piece 543A and the second engaging piece 543B function as part of the pair of lock sections 5L (FIG. 4) of the moving mechanism section 50A.

The first lower edge portion 544A and the second lower edge portion 544B respectively correspond to the right-side portion and the left-side portion along the lower edge of the moving panel 540. The first lower edge portion 544A and the second lower edge portion 544B each extend in the right-and-left direction.

The biasing spring 545 extends toward the light from the spring anchoring portion 542B. As has been previously described, the biasing spring 545 is anchored at its left end to the spring anchoring portion 542B and abut at its right end against the spring abutment portion 510A1 (FIG. 8) of the right-side wall 510A. According to the present embodiment, the biasing force of the biasing spring 545 is set to 2.5 N.

As shown in FIG. 8, the moving member 54 is mounted in the display frame 51 of the display section 50. Specifically, the operation button 541 is inserted into the cutaway portion 510B 1 of the left-side wall 510B from the above. In addition, the first lower edge portion 544A and the second lower edge portion 544B are respectively inserted through the right guide groove 510A2 and the left guide groove 510B2 of the display frame 51. The biasing spring 545 is disposed in compression between the spring anchoring portion 542B of the moving member 54 and the spring abutment portion 510A1 of the display frame 51. As a consequence, the moving member 54 is movable in the right-and-left direction along the right guide groove 510A2 and the left guide groove 510B2.

The operation button 541 is exposed from the display frame 51 at the left edge portion (one of the edge portions opposed in the right-and-left direction) of the display section 50. As shown in FIG. 3, the left operating section 5A has a left opening 5A1 at a right rear portion of the left operating section 5A. The left opening 5A1 is for accommodating the operation button 541 that projects toward the left. The left opening 5A1 is formed by cutting away a corner portion of the left operating section 5A. The operation button 541 can be pushed in a pushing direction (the direction indicated by an arrow D81 shown in FIG. 8, i.e., the right direction) from the left edge toward the right edge (the other edge portion opposed in the right-and-left direction) of the display section 50. Furthermore, the biasing spring 545 biases the operation button 541 in the biasing direction (toward the left) that is opposite to the pushing direction.

As shown in FIG. 8, the right regulation portion 510A3 projects from the inner wall surface of the right-side wall 510A of the display frame 51, whereas the left regulation portion 510B3 projects from the inner wall surface of the left-side wall 510B of the display frame 51. The right regulation portion 510A3 and the left regulation portion 510B3 prevent the moving member 54 from tilting forward within the display frame 51. In other words, the right regulation portion 510A3 prevents detachment of the first lower edge portion 544A of the moving member 54 from the right guide groove 510A2 in the direction toward the front. Likewise, the left regulation portion 510B3 prevents detachment of the second lower edge portion 544B of the moving member 54 from the left guide groove 510B2 in the direction toward the front.

When the moving member 54 is mounted in the display frame 51, the first engaging piece 543A and the second engaging piece 543B respectively come to be inserted through the first opening 513A and the second opening 513B formed in the rear wall 512, as shown in FIG. 7. In addition, the first engaging piece 543A and the second engaging piece 543B inserted through the first opening 513A and the second opening 513B are further inserted into the first guide section 531 and the second guide section 532 of the guide section 53 disposed behind the rear wall 512, as shown in FIG. 4. With respect to each of the first opening 513A and the second opening 513B having an L shape, a portion extending in the up-and-down direction is for allowing a corresponding one of the first engaging piece 543A and the second engaging piece 543B to pass through when the moving member 54 is mounted into the display frame 51.

The first guide section 531 and the second guide section 532 respectively cooperate with the first engaging piece 543A and the second engaging piece 543B to together function as part the pair of lock sections 5L (FIG. 4) of the moving mechanism section 50A. In other words, the respective lock sections 5L in the pair is disposed one on either edge portion of the display section 50 opposed to each other in the right-and-left direction. In response to release of the force pushing the operation button 541, the pair of lock sections 5L locks the display section 50 in either the first position or the second position relative to the upper housing 200C.

As shown in FIGS. 3 and 4, when the display section 50 is in the first position and thus substantially flush with both the left operating section 5A and the right operating section 5B, the first engaging piece 543A and the second engaging piece 543B are in engagement with the 1-1 engagement groove 531B and the 2-1 engagement groove 532B, respectively. In this state, as shown in FIG. 7, the first engaging piece 543A abuts against a 1-1 abutment portion A1 of the first opening 513A at its arc shaped upper edge, whereas the second engaging piece 543B abuts against a 2-1 abutment portion B1 of the second opening 513B at its arc shaped upper edge.

In this state, suppose that the user of the image forming apparatus 1 pushes the operation button 541 toward the right (indicated by an arrow D81 shown in FIG. 8). In response to the force pushing the operation button 541, the first engaging piece 543A and the second engaging piece 543B are displaced toward the right against the biasing force of the biasing spring 545 and detached from the 1-1 engagement groove 531B and the 2-1 engagement groove 532B, respectively. Then, the first engaging piece 543A and the second engaging piece 543B enter the first move groove 531A and the second move groove 532A to move upward within the first move groove 531A and the second move groove 532A.

In this state, the first engaging piece 543A abuts against a 1-2 abutment portion A2 of the first opening 513A at its arc shaped upper edge, whereas the second engaging piece 543B abuts against a 2-2 abutment portion B2 of the second opening 513B at its arc shaped upper edge. Therefore, when the user of the image forming apparatus 1 holds the operation button 541 to pull the operation button 541 upward, the moving member 54 can cause the operation button 541 and the display frame 51 to integrally turn upward on the rotating shaft 511 as the pivot.

Eventually, as shown in FIG. 6, the first engaging piece 543A and the second engaging piece 543B each reach a position to the right of a corresponding one of the 1-2 engagement groove 531C and the 2-2 engagement groove 532C. Upon release of the force pushing the operation button 541, the biasing force of the biasing spring 545 biases the first engaging piece 543A and the second engaging piece 543B into engagement with the 1-2 engagement groove 531C and the 2-2 engagement groove 532C, respectively. As a result, as shown in FIG. 5, the display section 50 is secured in the second position. Note that the display section 50 may be secured to a higher position in the second position. In this case, the first engaging piece 543A and the second engaging piece 543B are likewise brought into engagement into the 1-3 engagement groove 531D and the 2-3 engagement groove 532D, respectively.

Suppose, on the other hand, that the operation button 541 is pushed in the state where the display section 50 is in the second position. In this case, the first engaging piece 543A and the second engaging piece 543B enter the first move groove 531A and the second move groove 532A, respectively. Then, under the weight of the display section 50, the first engaging piece 543A and the second engaging piece 543B move downward respectively within the first move groove 531A and the second move groove 532A. As a result, the display section 50 is moved from the second position to the first position. That is, the user is allowed to cause the display section 50 to move back into the first position, simply by pushing the button.

Next, a modification of the guide section 53 shown in FIGS. 4-8 and 11 will be described (the modified guide section is denoted by 63 below). FIG. 12 shows the guide section 63. The guide section 63 is attached to the upper front wall 200C1 (FIG. 3), by replacing the guide section 53. In FIG. 12, components of the guide section 63 that are similar to the components of the guide section 53 are accompanied by the reference signs denoting corresponding components within parentheses, and a detailed explanation thereof is omitted.

Similarly to the guide section 53, the guide section 63 includes a guide panel 630, a first guide section 631, and a second guide section 632. The first guide section 631 includes a first move groove 631A, a 1-1 engagement groove 631B, a 1-2 engagement groove 631C, and a 1-3 engagement groove 631D. The second guide section 632 includes a second move groove 632A, a 2-1 engagement groove 632B, a 2-2 engagement groove 632C, and a 2-3 engagement groove 632D.

The following describes where the guide section 63 differs from the guide section 53 in structure. The 1-2 engagement groove 631C and the 1-3 engagement groove 631D each have an inclined surface 631E at its bottom. Each inclined surface 631E is inclined downward toward the first move groove 631A at a prescribed angle (for example, at about 45° relative to the horizontal direction). Likewise, the 2-2 engagement groove 632C and the 2-3 engagement groove 632D each have an inclined surface 632E at its bottom. Each inclined surface 632E is inclined downward toward the second move groove 632A at a prescribed angle (for example, at about 45° relative to the horizontal direction).

In addition, with respect to a generally lower half of the second move groove 632A, the width in the right-and-left direction of the second move groove 632A is the same as the width in the right-and-left direction of the first move groove 532A of the guide section 53 shown in FIG. 11. With respect to a generally upper half of the second move groove 632A, on the other hand, the width in the right-and-left direction is wider than that of the generally lower half of the second move groove 632A. That is, the second move groove 632A has a right wall surface including a step surface 632F (stopper portion) generally centrally in the up-and-down direction and thus the right wall surface defines the shape of a stair. The step surface 632F is a horizontal surface and located at a position opposite the 2-2 engagement groove 632C. The first move groove 631A extends in the up-and-down direction and its width in the right-and-left direction is the same as the width of the generally upper half of the second move groove 632A in the right-and-left direction.

Next, the following describes the difference between the structure in which the guide section 63 is used as the operating section 5 and the structure in which the guide section 53 is used as the operating section 5, with respect to the operation of the display section 50. When the rear edge portion 51B of the display section 50 is pushed down with a prescribed force in the state where the display section 50 is locked in the second position, the moving mechanism section 50A releases the lock of the display section 50. More specific details are as follows.

When the display section 50 is in the second position, the first engaging piece 543A of the moving panel 540 is in engagement with the 1-2 engagement groove 631C or with the 1-3 engagement groove 631D, whereas the second engaging piece 543B is in engagement with the 2-2 engagement groove 632C or with the 2-3 engagement groove 632D. In this state, the rear edge portion 51B of the display section 50 is raised higher than the left operating section 5A and the right operating section 5B.

When the user pushes the rear edge portion 51B of the display section 50 in the second position from the above with a prescribed force or greater, the display frame 51 turns downward so that the moving panel 540 moves against the biasing force of the biasing spring 545. Consequently, the first engaging piece 543A moves along the inclined surface 631E into the first move groove 631A, whereas the second engaging piece 543B moves along the inclined surface 632E into the second move groove 632A. As a result, without having to operate the operation button 541, the user is allowed to move the display section 50 from the second position to the first position by pushing the rear edge portion 51B of the display section 50 from the above.

Furthermore, when closing the automatic document reader 3 by holding its front portion other than the handle section 33 or placing an original document sheet on the contact glass of the upper housing 200C, the user may accidentally touch the rear edge portion 51B of the display section 50 that is in the second position. In that event, the display section 50 automatically retracts and thus does not obstruct the user. In addition, it is possible to adjust the force (prescribed force) that needs to be applied to the rear edge portion 51B of the display section 50 from the above for causing the automatic turning of the display section 50 in the second position, by adjusting the biasing force of the biasing spring 545 and/or the inclination angle of the inclined surface 631E and inclined surface 632E with respect to the horizontal direction.

The following describes the difference with the structure in which the guide section 53 is used, with respect to the operation of changing the tilt angle from a lager tilt angle to a smaller tilt angle by operating the operation button 541 when the display section 50 is in the second position. The moving mechanism section 50A secures the display section 50 in the second position at either a larger tilt angle (first tilt angle) or a smaller tilt angle (a second tilt angle that is smaller than the first tilt angle). The moving mechanism section 50A includes the step surface 632F. When the display section 50 is turned from a position at the larger tilt angle to a position at the smaller tilt angle under the force pushing the operation button 541, the step surface 632F stops the display section 50 from turning further than the position at or around the smaller tilt angle. More specific details are as follows.

When the display section 50 is in the second position at the larger tilt angle, the first engaging piece 543A of the moving panel 540 is in engagement with the 1-3 engagement groove 631D and the second engaging piece 543B is in engagement with the 2-3 engagement groove 632D.

First, when the user pushes the operation button 541 toward the right, the moving panel 540 moves toward the right against the biasing force of the biasing spring 545. Consequently, the first engaging piece 543A comes to abut against the right wall surface of the first move groove 631A, whereas the second engaging piece 543B comes to abut against the right wall surface of the second move groove 632A.

Next, when the user moves the operation button 541 downward while keep pushing the operation button 541 toward the right, the second engaging piece 543B now comes to abut against the step surface 632F of the second move groove 632A. This causes the display section 50 to stop turning further. As a result, the user can sense that the display section 50 is now around the position at the smaller tilt angle. Then, when the user brings the operation button 541 back toward the left, the first engaging piece 543A and the second engaging piece 543B can be smoothly brought into engagement with the 1-2 engagement groove 631C and the 2-2 engagement groove 632C, respectively. As a result, the display section 50 is placed in the second position at the smaller tilt angle.

To move the display section 50 to the first position, after the turning of the display section 50 comes to stop at the step surface 632F, the user slightly pulls the operation button 541 toward the left and then moves the operation button 541 downward. This causes the first engaging piece 543A and the second engaging piece 543B to engage with the 1-1 engagement groove 631B and the 2-1 engagement groove 632B, respectively.

As has been descried with reference to FIGS. 1-13, the present embodiment provides the image forming apparatus 1 and the operating section 5 with which the tilt of the display section 50 is variable while mainlining easy access to the sheets S discharged to the in-body discharge section 210.

According to the present embodiment, in addition, the moving mechanism section 50A can appropriately move the display section 50. Furthermore, the display section 50 can be secured to the upper housing 200C at a selectable one of a plurality of tilt angles within the second position. Consequently, image forming information presented on the display section 50 is stably visible to the users in various postures. Furthermore, applying and releasing a force pushing the operation button 541 can appropriately cause the position switch of the display section 50.

Up to this point, the description has been given of the operating section 5 according to the embodiment of the present disclosure and the image forming apparatus 1 including the operating section 5. However, the present disclosure is not limited to such and various modified embodiments including the following are possible, for example.

(1) According to the embodiment described above, the pair of lock sections 5L is provided. That is, the display section 50 is provided with the first engaging piece 543A and the first guide section 531 on one of the edge portions opposed in the right-and-left direction and with the second engaging piece 543B and the second guide section 532 on the other edge portion. However, the present disclosure is not limited to this particular manner. It is applicable to provide a single lock section. For example, to provide a lock section that operates in response to a push of the operation button 541, an engaging piece that is similar to the first engaging piece 543A and a guide section that is similar to the first guide section 531 may be disposed. The single lock section can be disposed at one location in one of the edge portions opposed in the right-and-left direction or in the central portion of the display section 50. Alternatively, three or more lock sections may be provided.

(2) According to the embodiment described above, the rear wall 512 is disposed between the moving member 54 and the guide section 53. However, the present disclosure is not limited to this particular manner. According to another modified embodiment, the rear wall 512 may be omitted. In such a case, by the moving member 54 pushing the top plate 51T downward, the moving member 54 turns integrally with the display frame 51.

What is claimed is:

1. An image forming apparatus comprising:
a lower housing having an interior space;
an image forming section disposed in the interior space and configured to form an image on a sheet;
a discharge section disposed on an upper surface of the lower housing and configured to receive the sheet discharged;
an upper housing disposed above the discharge section in spaced relation with the discharge section; and
an operating section projecting forward from the upper housing, wherein
the operating section includes
an input section configured to receive input of image forming information; and
a display section disposed adjacent to the input section and configured to display the image forming information thereon,
the display section includes a frame section,
the frame section includes a first side wall a second side wall, a pair of rotating shafts, and a rear wall,
the rear wall connects a rear edge of the first side wall and a rear edge of the second side wall in a right-and-left direction,
the right-and-left direction is perpendicular to an up-and-down direction and a front-to-rear direction of the operating section,
the rotating shafts project from respective front edge portions of the first and second side walls in the right-and-left direction;
the second side wall has a cutaway portion in a rear edge portion of the second side wall,
the operating section has an opening in a rear edge portion of the operating section, the opening opening upward in the operating section,
a position of the display section is switchable between a first position and a second position,
the first position is where the display section is flush with the input section,
the second position is where the display section is tilted forward more than the input section, by turning the display section on the rotating shafts on a front edge side of the display section as pivots to raise a rear edge side of the display section upward from the first position,
the image forming apparatus further comprising a moving mechanism section configured to move the display section between the first position and the second position,
the moving mechanism section includes
a moving member attached inside the frame section of the display section, and a push button disposed at a position corresponding to the rear edge side in one of edge portions of the display section, the edge potions being opposed in the right-and-left direction of the display section, the push button being spaced from one of the paired rotating shafts in front-to-rear direction, the push button being inserted through the cutaway portion of the second side wall to be exposed from the frame section and accommodated in the opening,
in response to upward pulling of the push button, the push button and the frame section of the display section become turnable integrally upward about the respective rotating shafts as pivots via the moving section,
the push button includes
a push portion pushed or held by a user, and
a base end portion connected to the moving member,
the push portion is exposed from the opening and extends upward from
the base end portion in the opening,
in response to a force pushing the push button, the display section is allowed to be moved between the first position and the second position, and
in response to release of the force pushing the push button, the display section is locked in either the first position or the second position.

2. An image forming apparatus according to claim 1, wherein
the moving mechanism section secures the display section in the second position at one of a plurality of tilt angles in a stepwise manner.

3. An image forming apparatus according to claim 1, wherein
when the rear edge side of the display section is pressed down with a prescribed force in the state where the display section is locked in the second position, the moving mechanism section releases the lock of the display section.

4. An image forming apparatus according to claim 1, wherein
the moving mechanism section secures the display section in the second position at either a first tilt angle or a second tilt angle that is smaller than the first tilt angle, and
the moving mechanism section further includes a stopper portion configured to stop the display section from turning further than a position at or around the second tilt angle when the display section is turned, under the force pushing the push button, from a position at the first tilt angle to the position at the second tilt angle.

5. An image forming apparatus according to claim 1, wherein
the display section has a rectangular shape with a prescribed width in the right-and-left direction,
the moving mechanism section further includes a pair of lock sections, one of the lock sections being disposed in the one edge portion and another of the lock sections being disposed in another edge portion of the display section opposed in the right-and-left direction, and
in response to the release of the force pushing the push button, the pair of lock sections locks the display section to the upper housing in either the first position or the second position.

6. An image forming apparatus according to claim 1, further comprising
a discharge member configured to discharge the sheet having the image formed thereon to the discharge section in a direction from rear to front, and
a front edge of the operating section is located rearward from a front edge of the lower housing in the front-to-rear direction.

7. An image forming apparatus according to claim 1, wherein the input section includes a plurality of buttons configured to be used to input the image forming information.

8. An image forming apparatus according to claim 1, wherein
the push button has a general L shape.

9. An image forming apparatus according to claim 1, wherein
the push button is configured to be pushed in a pushing direction from one edge portion toward another edge portion of the display section in the right-and-left direction, and
the push portion of the push button extends upward from the base end portion of the push button in a direction perpendicular to the pushing direction.

10. An image forming apparatus, comprising:
a lower housing having an interior space;
an image forming section disposed in the interior space and configured to form an image on a sheet;
a discharge section disposed on an upper surface of the lower housing and configured to receive the sheet discharged;
an upper housing disposed above the discharge section in spaced relation with the discharge section; and
an operating section projecting forward from the upper housing, wherein the operating section includes
an input section configured to receive input of image forming information, and
a display section disposed adjacent to the input section and configured to display the image forming information thereon,
the display section includes a rotating shaft on a front edge side of the display section,
a position of the display section is switchable between a first position and a second position,
the first position is where the display section is flush with the input section,
the second position is where the display section is tilted forward more than the input section, by turning the display section on the rotating shaft on the front edge side of the display section as a pivot to raise a rear edge side of the display section upward from the first position,
the image forming apparatus further comprising a moving mechanism section configured to move the display section between the first position and the second position,
the moving mechanism section includes a push button disposed at a position corresponding to the rear edge side in one of edge portions of the display section, the edge portions being opposed in a right-and-left direction of the display section,
the right-and-left direction is perpendicular to an up-and-down direction and a front-to-rear direction of the operating section,
the push button is spaced from the rotating shaft in the font-to-rear direction,
in response to a force pushing the push button, the display section is allowed to be moved between the first position and the second position,
in response to release of the force pushing the push button, the display section is locked in either the first position or the second position,
the display section has a rectangular shape with a prescribed width in the right-and-left direction,
the moving mechanism section further includes a pair of lock sections, one of the lock sections being disposed in the one edge portion and another of the lock sections being disposed in another edge portion of the display section opposed in the right-and-left direction,
in response to the release of the force pushing the push button, the pair of lock sections locks the display section to the upper housing in either the first position or the second position,
the display section includes
a frame section having a rectangular shape, and
a display panel disposed in the frame section and configured to display the image forming information thereon,
the push button is exposed from the frame section at the one edge portion of the display section and configured to be pushed in a pushing direction from the one edge portion toward the other edge portion of the display section in the right-and-left direction,
the moving mechanism section includes
a moving member attached to an inside of the frame section at the rear edge side of the display section,
the push button is connected to one end side of the moving member in the right-and-left direction,
the moving member includes a spring anchoring portion disposed on the other end side of the moving member in the right-and-left direction,
the moving mechanism further includes
a biasing spring disposed in compression between the spring anchoring portion of the moving member and the frame section and configured to bias the push button via the moving member in a biasing direction that is opposite to the pushing direction,
a pair of guide pins being part of the lock sections and disposed in spaced relation with each other in the right-and-left direction, and
a guide plate secured to the upper housing,
the guide pins each project from the moving member toward rear in a direction perpendicular to the pushing direction,
the guide plate includes a pair of guide grooves being part of the lock sections and configured to receive the pair of guide pins therethrough so as to allow the pair of guide pins movable, and
in response to upward pulling of the push button, the pushing button and the frame section of the display section becomes turnable integrally upward about the rotating shaft as a pivot via the moving member.

11. An image forming apparatus according to claim 10, wherein
each of the guide grooves includes
a movement-enabling groove disposed to extend in the up-and-down direction and configured to allow a corresponding one of the guide pins to move up and down within the movement-enabling groove along with the movement of the display section between the first position and the second position, and
a plurality of engagement-enabling grooves extending in the biasing direction continuously from a plurality of locations of the movement-enabling groove arranged in the up-and-down direction,
as the display section is secured in either the first position or the second position, each of the guide pins engages with one of the plurality of engagement-enabling grooves,
when the push button is pushed by the force in the pushing direction to cause each of the guide pins to be detached from the corresponding engagement-enabling groove, the guide pin is movable within the corresponding movement-enabling groove in the up-and-down direction thereby to allow the push button to turn integrally with the frame section through the moving member, and when the force pushing the push is released, each of the guide pins engages with a corresponding one of the engagement-enabling grooves thereby to secure the display section in either the first position or the second position.

12. An image forming apparatus according to claim 11, wherein when the push button is pushed in the state where the display section is in the second position, each of the guide pins enters a corresponding one of the movement-enabling grooves and then moves downward within the movement-enabling groove under the weight of the display section such that the display section is moved from the second position to the first position.

13. An image forming apparatus according to claim 10, wherein the operating section further includes a supporting frame configured to support the input section and the display section from beneath, and by the frame section of the display section turning relatively to the supporting frame, the display section is placed in either the first position or the second position.

14. An image forming apparatus according to claim 10, wherein the display panel is a touch panel.

15. An image forming apparatus according to claim 10, wherein the operating section has an opening on a rear edge side of the operating section, and the push button is accommodated within the opening and exposed through the opening.

16. An image forming apparatus according to claim 10, wherein the frame section includes a side wall, the rotating shaft extends from a front edge portion of the side wall, the side wall has a cutaway portion at a rear edge portion of the side wall, and the push button is disposed to extend through the cutaway portion.

17. An image forming apparatus according to claim 10, wherein the frame section includes a first side wall, a second side wall, a pair of the rotating shafts, and a rear wall, the rear wall connects a rear edge of the first side wall and a rear edge of the second side wall in the right-and-left direction, the first side wall includes a spring abutment portion, the biasing spring is disposed in compression between the spring anchoring portion of the moving member and the spring abutment portion of the first side wall, the rear wall has a first opening and a second opening, and the respective guide pins are inserted in the first opening and the second opening.

18. An operating device disposed to project forward from an upper housing of an image forming apparatus, the operating device comprising:

an input section configured to receive input of image forming information;

a display section disposed adjacent to the input section and configured to display the image forming information thereon; and an opening opening upward in a rear edge portion of the operating device, wherein the display section includes a frame section, the frame section includes a first side wall, a second side wall, a pair of rotating shafts, and a rear wall, the rear wall connects a rear edge of the first side wall and a rear edge of the second side wall in a right-and-left direction, the right-and-left direction is perpendicular to an up-and-down direction and a front-to-rear direction of the operating device, the rotating shafts project from respective front edge portions of the first and second side walls in the right-and-left direction, the second side wall has a cutaway portion in a rear edge portion of the second side wall, a position of the display section is switchable between a first position and a second position, the first position is where the display section is flush with the input section, the second position is where the display section is tilted forward more than the input section, by turning the display section on the rotating shaft on the front edge side of the display section as pivots to raise a rear edge side of the display section upward from the first position, the operating device further comprising a moving mechanism section configured to move the display section between the first position and the second position, the moving mechanism section includes a moving member attached inside the frame section of the display section, and a push button disposed at a position corresponding to the rear edge side in one of edge portions of the display section, the edge potions being opposed in the right-and-left direction of the display section, the push button being spaced one of the pair of rotating shafts in the front-to-rear direction, the push button being inserted through the cutaway portion of the second side wall to be exposed from the frame section and accommodated in the opening, in response to upward pulling of the push button, the push button and the frame section of the display section become rotatable integrally upward about the respective rotating shafts as pivots via the moving section, the push button includes a push portion configured to be pushed or held by a user, and a base end portion connected to the moving member, the push portion is exposed from the opening and extends upward from the base end portion in the opening, in response to a force pushing the push button, the display section is allowed to be moved between the first position and the second position, and in response to release of the force pushing the push button, the display section is locked in either the first position or the second position.

19. An operating device according to claim 18, wherein the push button is configured to be pushed in a pushing direction from one edge portion toward another edge portion of the display section in the right-and-left direction, and the push portion of the push button extends upward from the base end portion of the push button in a direction perpendicular to the pushing direction.

* * * * *